(No Model.)
J. F. DILL.
NUT LOCK.
No. 365,674. Patented June 28, 1887.
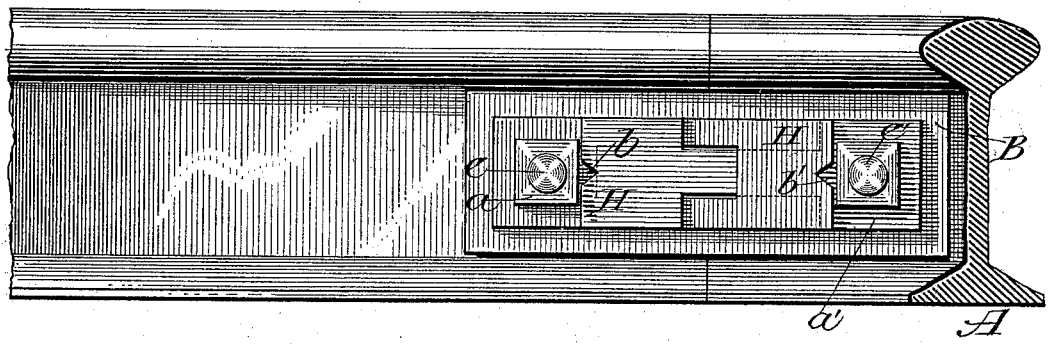
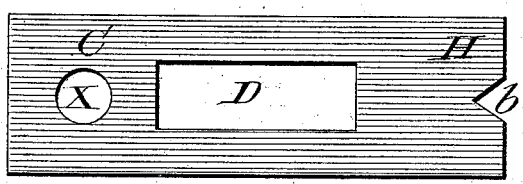 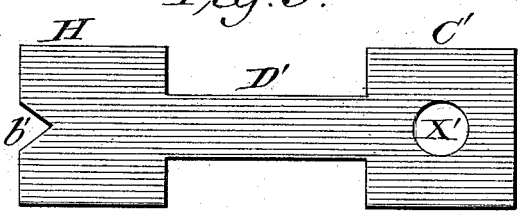
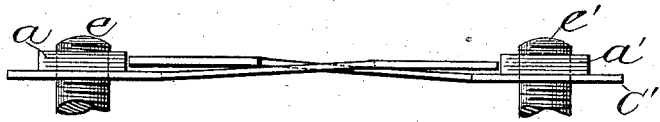
Witnesses:
Colon E. Kemon
P. B. Turpin.
Inventor
J. F. Dill
By Munn & Co
Attorneys

UNITED STATES PATENT OFFICE.

J. FRANK DILL, OF RIDGWAY, PENNSYLVANIA.

NUT-LOCK.

SPECIFICATION forming part of Letters Patent No. 365,674, dated June 28, 1887.

Application filed October 13, 1886. Serial No. 216,082. (No model.)

*To all whom it may concern:*

Be it known that I, J. FRANK DILL, of the borough of Ridgway, county of Elk, and State of Pennsylvania, have invented a new and useful Improvement in Nut-Locks and Washers; and I do hereby declare that the following is a full, clear, and exact description of the construction and operation of the same, reference being had to the annexed drawings, making a part of this specification, and to the letters and figures marked thereon.

Similar letters refer to similar parts in the several figures therein.

Figure 1 in the drawings is a representation of a side elevation of my invention. Figs. 2 and 3 show the locking washer-plates detached from the fish-plates and from each other. Fig. 4 shows a side view of the plates drawn through the bolts $e$ and $e'$ before the locking-plates are pressed into position for locking the nuts. Fig. 5 shows the plate in position for locking the nuts.

My invention is especially adapted for use with bolts and nuts employed to secure fish-plates upon rails of railway-tracks, although it is fitted to secure nuts upon their bolts when used for other purposes.

In the accompanying drawings, A represents the two sections of a rail, and B the usual fish-plates. The two metal plates C and C', which form the subject of my invention, have at one of their ends washers and suitable holes, X and X', in each plate, for passing it over the bolts $e$ and $e'$ after the bolts have been passed through the rails and fish-plates. The plates C and C' have at their other ends short plates H, with V-shaped notches $b$ and $b'$.

Before attaching my device to the rails and fish-plates the plates C and C' are passed one through an opening in the other, so that the tongue D' fills the mortise, and the locking-plates H are bent to an angle, as shown in Fig. 4, to al-
low the nuts to be turned up to their position. After the washer-plates C and C' are passed over the bolts $e$ and $e'$, and the nuts $a$ and $a'$ are turned up, the washer-plates H may be bent down to the position shown in Figs. 1 and 5, forming a complete nut-lock, the end of each plate pressing down upon the end of the other. It will be seen that the square end H of the plates C and C' may be used for locking the nut in position, as shown in the drawings, or the V-shaped opening may be used to receive the corner of the nut in case it can be turned but one-eighth of the way around.

I am aware that Letters Patent have heretofore been granted to individuals for combined washer-plates and nut-locks. Of such is Letters Patent No. 190,443, issued to Evan A. Mercer and Joseph D. C. Pownall; but in this latter device the locking-plates are not prevented by their construction from being wrenched apart by the strain on the nut, the bolt acting as a pivot. In my device this objection is overcome by passing the one plate through the other, so that each holds the other in place even when the bolts have become worn and loose.

Having now fully described my device, what I claim as new, and desire to secure by Letters Patent, is—

The plates C and C', with the openings X and X', with the mortise D and the tongue D', by means of which the plates are bound together for locking the nuts, substantially as set forth.

In testimony whereof I have hereunto set my hand this 11th day of October, in the year of our Lord 1886.

J. FRANK DILL.

In presence of—
  S. A. ROTE,
  N. T. ARNOLD.